(12) United States Patent
Lu et al.

(10) Patent No.: US 9,462,131 B2
(45) Date of Patent: *Oct. 4, 2016

(54) VOICE MESSAGING METHOD AND SYSTEM, AND CONVERGED MESSAGING SERVER AND CLIENT

(71) Applicant: ZTE Corporation, Shenzhen, Guangdong (CN)

(72) Inventors: Yan Lu, Shenzhen (CN); Xin Ding, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/389,562

(22) PCT Filed: Apr. 8, 2013

(86) PCT No.: PCT/CN2013/073907
§ 371 (c)(1),
(2) Date: Sep. 30, 2014

(87) PCT Pub. No.: WO2013/152703
PCT Pub. Date: Oct. 17, 2013

(65) Prior Publication Data
US 2015/0072657 A1    Mar. 12, 2015

(30) Foreign Application Priority Data

Apr. 13, 2012    (CN) .......................... 2012 1 0108978

(51) Int. Cl.
*H04M 1/725*    (2006.01)
*H04M 1/663*    (2006.01)
(Continued)

(52) U.S. Cl.
CPC .......... *H04M 3/53333* (2013.01); *H04L 51/10* (2013.01); *H04W 4/12* (2013.01)

(58) Field of Classification Search
CPC ................................. H04W 4/12; H04W 4/14
USPC .......................... 455/412.1–412.2, 413, 466
See application file for complete search history.

(56) References Cited

U.S. PATENT DOCUMENTS 7,123,695 B2   10/2006  Malik
7,292,679 B2   11/2007  Darsin
(Continued)

FOREIGN PATENT DOCUMENTS

CN    1848819 A    10/2006
CN    100499714 C   6/2009
(Continued)

OTHER PUBLICATIONS

International Search Report in international application No. PCT/CN2013/073907, mailed on Jul. 11, 2013.
(Continued)

*Primary Examiner* — Anthony Addy
*Assistant Examiner* — Matthew Genack
(74) *Attorney, Agent, or Firm* — Oppedahl Patent Law Firm LLC (57) ABSTRACT

A voice messaging method, comprising: a sender converged messaging client initiates a session invitation and has a media negotiation with a converged messaging server, wherein the session invitation carries voice message recipient information and indicates this session for voice messaging; the sender converged messaging client transmits voice data to the converged messaging server on the basis of the media negotiation result; the converged messaging server encapsulates the received voice data as a voice message and stores the voice message in message storage server; the recipient converged messaging client retrieves the voice message from the message storage server. A voice messaging system, the converged messaging server and a client are products respectively corresponding to the above-described method or certain steps therein.

12 Claims, 6 Drawing Sheets (51) Int. Cl.
*H04M 3/533* (2006.01)
*H04L 12/58* (2006.01)
*H04W 4/12* (2009.01)

(56) References Cited

U.S. PATENT DOCUMENTS

| | | |
|---|---|---|
| 8,060,621 B2 | 11/2011 | Lee |
| 8,224,288 B1* | 7/2012 | Karam .................. H04W 4/12 379/88.13 |
| 8,284,773 B1* | 10/2012 | Woleben .............. H04L 12/189 370/310 |
| 8,374,326 B2 | 2/2013 | Shi |
| 8,750,837 B2 | 6/2014 | Gandhi |
| 8,761,355 B2 | 6/2014 | Reding |
| 2004/0121762 A1 | 6/2004 | Chou |
| 2005/0018821 A1 | 1/2005 | Darsin |
| 2006/0030297 A1 | 2/2006 | Coble |
| 2006/0166650 A1 | 7/2006 | Berger |
| 2008/0043969 A1 | 2/2008 | Shi |
| 2008/0089324 A1* | 4/2008 | Polk .................... H04L 65/608 370/389 |
| 2008/0114881 A1 | 5/2008 | Lee |
| 2008/0160962 A1 | 7/2008 | Hao |
| 2009/0271469 A1* | 10/2009 | Benco ................ H04N 21/8146 709/201 |
| 2009/0279455 A1 | 11/2009 | Wang |
| 2010/0056109 A1 | 3/2010 | Wilson |
| 2010/0197278 A1 | 8/2010 | Anderl |
| 2010/0312897 A1* | 12/2010 | Allen .................. H04L 12/1822 709/227 |
| 2011/0034151 A1 | 2/2011 | Brouwer |
| 2011/0134843 A1* | 6/2011 | Noldus ............... H04W 60/005 370/328 |
| 2012/0011260 A1 | 1/2012 | Lu |
| 2012/0128145 A1 | 5/2012 | Shi |
| 2012/0166562 A1 | 6/2012 | Lu |
| 2012/0250622 A1* | 10/2012 | Gomez Diaz ......... H04L 45/306 370/328 |
| 2013/0282850 A1 | 10/2013 | Lu |
| 2014/0057605 A1 | 2/2014 | Vendrow et al. |
| 2015/0072657 A1 | 3/2015 | Lu et al. |
| 2015/0094033 A1 | 4/2015 | Ding et al. |

FOREIGN PATENT DOCUMENTS

| | | |
|---|---|---|
| CN | 101854597 A | 10/2010 |
| CN | 102026109 A | 4/2011 |
| CN | 102256216 A | 11/2011 |
| CN | 102291693 A | 12/2011 |
| EP | 2124399 A1 | 11/2009 |
| EP | 2824949 A1 | 1/2015 |
| WO | 2008060084 A1 | 5/2008 |
| WO | 2009082097 A1 | 7/2009 |
| WO | 2013152702 A1 | 10/2013 |

OTHER PUBLICATIONS

English Translation of the Written Opinion of the International Search Authority in international application No. PCT/CN2013/073907, mailed on Jul. 11, 2013.
International Search Report in international application No. PCT/CN2013/073905, mailed on Jul. 18, 2013.
English Translation of the Written Opinion of the International Search Authority in international application No. PCT/CN2013/073905, mailed on Jul. 18, 2013.
Supplementary European Search Report in European application No. 13775483.4, mailed on Feb. 3, 2015.
Converged IP Messaging Requirements, mailed on Jan. 11, 2007.

* cited by examiner

VOICE MESSAGING METHOD AND SYSTEM, AND CONVERGED MESSAGING SERVER AND CLIENT

TECHNICAL FIELD

The disclosure relates to the field of communication, in particular to a voice messaging method, a voice messaging system, a converged messaging server and a converged messaging client.

BACKGROUND

A converged messaging service is a novel messaging service developed in the last few years. The purpose of developing the service is to implement the interworking and converging of multiple messaging services, provide a unified messaging service and bring a consistent and convenient messaging service experience to a user. At present, a typical converged messaging service is a Converged IP Messaging (CPM) service launched by Open Mobile Alliance (OMA). The CPM service converges multiple conventional messaging services, including Instant Message (IM), Push-To-Talk over Cellular (POC), Mobile E-mail (MEM), Short Messaging Service (SMS), Multimedia Messaging Service (MMS) and the like.

However, converging or interworking with a voice mail service is not taken into consideration in a conventional converged messaging service system. With an Internet Protocol (IP)-based voice mail service, the user can record and transmit a voice message to another user at any time anywhere, and can also manage the stored voice message in a visual way like managing an E-mail. The IP-based voice mail service is convenient to use, can provide a good user experience, and has been loved by more and more users. If the IP-based voice mail service can be converged with the conventional converged messaging service to enable the converged messaging service user to transmit, receive and manage the voice message through the converged messaging service system, the user experience can certainly be further improved.

SUMMARY

To this end, the main purpose of the disclosure is to provide a voice messaging method, a voice messaging system, a converged messaging server and a converged messaging client, which can solve the problem that a voice message cannot be transmitted, received or managed through a converged messaging service system, thus improving the user experience.

In order to realize the purpose above, the technical solution of the embodiments of the disclosure are implemented as follows.

a voice messaging method, includes:

a converged messaging client at a sender side initiates a session invitation, and has a media negotiation with a converged messaging server, in which the session invitation carries information on a voice message receiver and indicates this session is for voice messaging;

the converged messaging client at the sender side sends voice data to the converged messaging server according to a result of the media negotiation;

the converged messaging server encapsulates the received voice data into a voice message, and stores the voice message in a message storage server; and a converged messaging client at a receiver side acquires the voice message from the message storage server.

The information on a voice message receiver carried in the session invitation may be a user identifier, and the voice data may be sent by the converged message client at the sender side to the converged messaging server to which a voice message receiver belongs through the Real-Time Transport Protocol (RTP).

The information on a voice message receiver carried in the session invitation may be a group identifier or a user identifier of each user in a group.

The converged messaging client at the sender side sends the voice data to a group control server through the RTP, and the group control server sends through the RTP the voice data to each converged messaging server to which the voice message receiver belongs.

The method may further include: the message storage server sends a notification message to a user at the receiver side after storing the voice message.

A converged messaging server, includes: a media negotiation unit, a voice data receiving unit and a voice message generation unit.

The media negotiation unit is configured to have a media negotiation with a converged messaging client at a sender side after a session invitation is initiated by the converged messaging client at the sender side, and the session invitation carries information on a voice message receiver and indicates this session is for voice messaging.

The voice data receiving unit is configured to receive voice data sent by the converged messaging client at the sender side.

The voice message generation unit is configured to encapsulate the voice data received by the voice data receiving unit into a voice message and store the voice message in a message storage server.

A converged messaging client, includes: a session invitation initiation unit, a media negotiation unit and a voice data sending unit.

The session invitation initiation unit is configured to initiate a session invitation, and the session invitation carries information on a voice message receiver and indicates this session is for voice messaging.

The media negotiation unit is configured to have a media negotiation with a converged messaging server after the session invitation is initiated by the session invitation initiation unit.

The voice data sending unit is configured to send voice data to the converged messaging server according to a negotiation result from the media negotiation unit.

A voice messaging system, includes: an above-mentioned converged messaging client which is at a sender side, an above-mentioned converged messaging server, a message storage server and a converged messaging client at a receiver side.

The message storage server is configured to store a voice message.

The converged messaging client at the receiver side is configured to acquire the voice message from the message storage server.

The converged messaging server may be configured to directly receive voice data transmitted by the converged messaging client at the sender side, or to indirectly receive the voice data transmitted by the converged messaging client at the sender side via a group control server.

The message storage server may be further configured to, after storing the voice message, transmit a notification message to a user at the receiver side.

According to the voice messaging method, the voice messaging system, the converged messaging server and the converged messaging client in the embodiments of the disclosure, the converged messaging client at the sender side initiates the session invitation which carries the information on a voice message receiver and indicates this session for voice messaging, and has the media negotiation with the converged messaging server; the converged messaging client at the sender side transmits the voice data to the converged messaging server according to the media negotiation result; the converged messaging server encapsulates the received voice data into the voice message, and stores the voice message into the message storage server; and the converged messaging client at the receiver side acquires the voice message from the message storage server. With the solution according to the embodiments of the disclosure, a user can leave a voice message through the converged messaging service system, thereby simultaneously enjoying a converged messaging service and a voice messaging service and gaining a good user experience.

DETAILED DESCRIPTION

The basic thought of the embodiments of the disclosure is: a converged messaging client as a sender initiates a session invitation, and has a media negotiation with a converged messaging server, the session invitation carries information about a voice message receiver and indicates this session is for voice messaging; the converged messaging client as the sender transmits voice data to the converged messaging server according to a media negotiation result; the converged messaging server encapsulates the received voice data into a voice message, and stores the voice message in a message storage server; and a converged messaging client as a receiver acquires the voice message from the message storage server.

Figure 1:
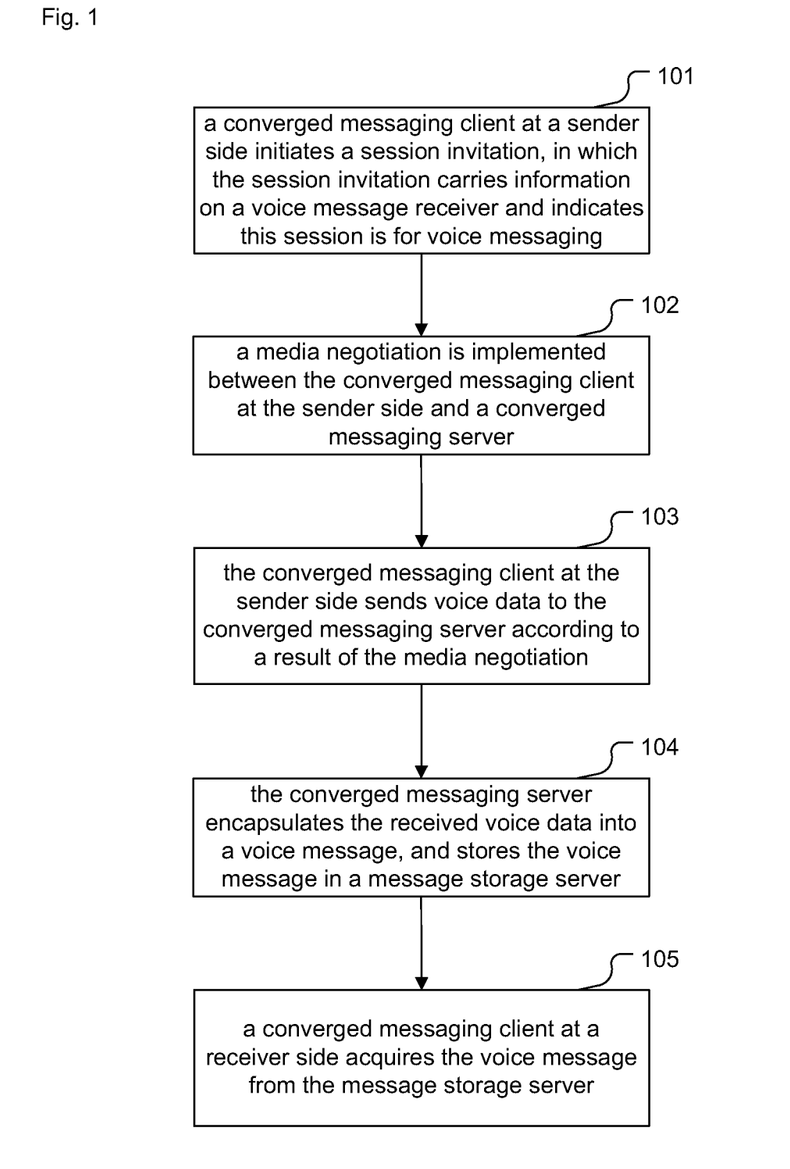
FIG. 1 is a flowchart of a voice messaging method according to an embodiment of the disclosure.

FIG. 1 is a flowchart of a voice messaging method according to an embodiment of the disclosure, and as shown in FIG. 1, the method includes:

S101: a converged messaging client at a sender side initiates a session invitation, in which the session invitation carries information on a voice message receiver and indicates this session is for voice messaging;

S102: a media negotiation is implemented between the converged messaging client at the sender side and a converged messaging server;

S103: the converged messaging client at the sender side sends voice data to the converged messaging server according to a result of the media negotiation;

S104: the converged messaging server encapsulates the received voice data into a voice message, and stores the voice message in a message storage server; and S105: a converged messaging client at a receiver side acquires the voice message from the message storage server.

Optionally, in S101, when it needs to leave a message, the converged messaging client (i.e., the sender) initiates the session invitation, and the information on the voice message receiver carried in the session invitation is a user identifier. Correspondingly, in S102, the media negotiation is to reach a parameter required by subsequent voice data real-time transmission. Correspondingly, in S103 and S104, after the user at the sender side starts voice messaging, the converged messaging client at the sender side sends the voice data in real time through RTP to the converged messaging server to which a voice message receiver belongs; and the converged messaging server receives the voice data, packs and encapsulates the voice data into the voice message, and stores the voice message in the message storage server.

Optionally, in S101, the converged messaging client at the sender side sends the session invitation after creating the voice message for the user, the information on the voice message receiver carried in the session invitation is a group identifier or a user identifier of each user in a group. Correspondingly, the media negotiation in S102 is a negotiation about a media parameter between the converged messaging client at the sender side and the group control server and a media parameter between the group control server and each converged messaging server. Correspondingly, in S103 and S104, the user at the sender side starts voice messaging, the converged messaging client at the sender side sends the voice data of the user in real time. Specifically, the converged messaging client at the sender side sends the voice data to the group control server through RTP, and then the group control server transmits the voice data through RTP to each converged messaging server to which a voice message receiver belongs; and each converged messaging server receives the voice data respectively, packs and encapsulates the voice data into the voice message, and stores the voice message in the message storage server to which the user at the receiver side belongs.

Optionally, the message storage server sends a notification message to the user at the receiver side after storing the voice message, and the user equipment at the receiver side acquires the voice message from the message storage server, and plays the voice message to the user.

Figure 2:
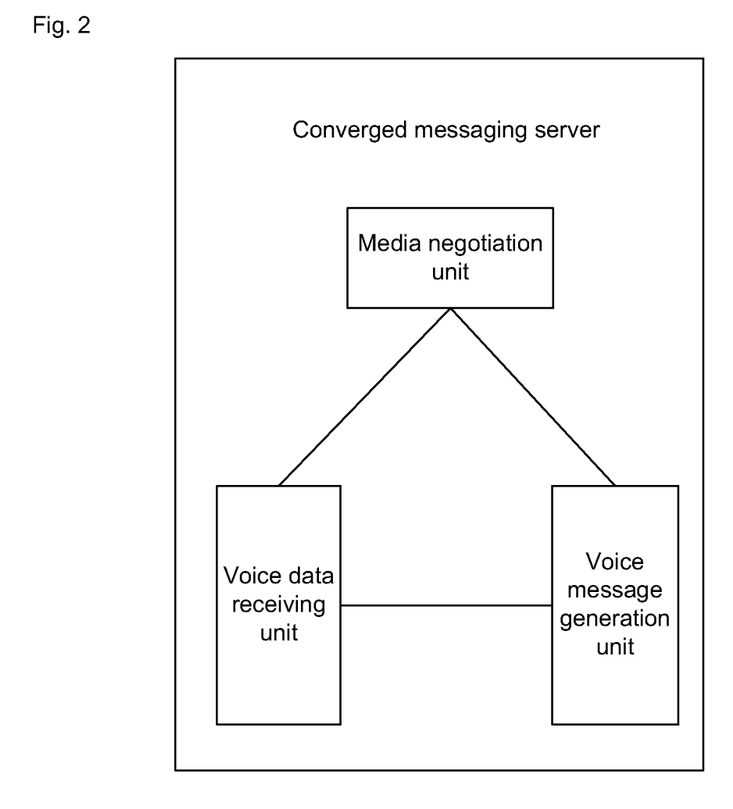
FIG. 2 is a structural diagram of a converged messaging server according to an embodiment of the disclosure.

The embodiment of the disclosure further provides a converged messaging server, and as shown in FIG. 2, the converged messaging server includes: a media negotiation unit, a voice data receiving unit and a voice message generation unit.

The media negotiation unit is configured to have a media negotiation with a converged messaging client at a sender side after a session invitation is initiated by the converged messaging client at the sender side. The session invitation carries information on a voice receiver and indicates this session is for voice messaging.

The voice data receiving unit is configured to receive voice data sent by the converged messaging client at the sender side.

The voice message generation unit is configured to encapsulate the voice data received by the voice data receiving unit into a voice message and store the voice message in a message storage server.

Figure 3:
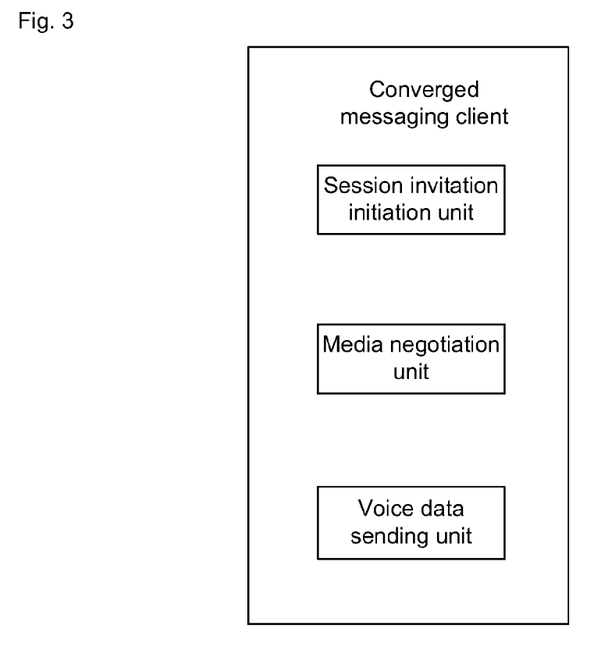
FIG. 3 is a structural diagram of a converged messaging client according to an embodiment of the disclosure.

The disclosure further provides a converged messaging client, and as shown in FIG. 3, the converged messaging client includes: a session invitation initiation unit, a media negotiation unit and a voice data sending unit.

The session invitation initiation unit is configured to initiate a session invitation which carries information on a voice message receiver and indicates this session is for voice messaging.

The media negotiation unit is configured to have a media negotiation with a converged messaging server after the session invitation is initiated by the session invitation initiation unit.

The voice data sending unit is configured to send voice data to the converged messaging server according to a negotiation result from the media negotiation unit.

Figure 4:
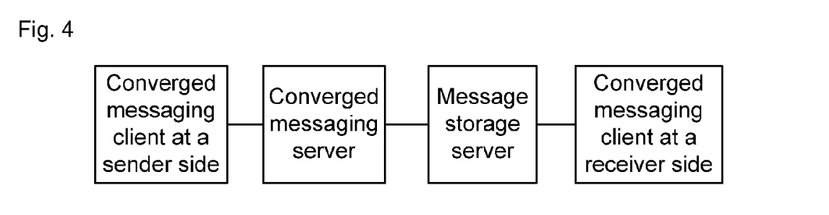
FIG. 4 is a structural diagram of a voice messaging system according to an embodiment of the disclosure.

The embodiment of the disclosure further provides a voice messaging system, and as shown in FIG. 4, the system includes: a converged messaging client at a sender side, a converged messaging server, a message storage server and a converged messaging client at a receiver side.

The converged messaging client at the sender side is the converged messaging client as shown in FIG. 3.

The converged messaging server is the converged messaging server as shown in FIG. 2.

The message storage server is configured to store a voice message.

The converged messaging client at a receiver side is configured to acquire the voice message from the message storage server.

Optionally, the converged messaging server is configured to directly receive voice data sent from the converged messaging client at the sender side, or to indirectly receive the voice data sent by the converged messaging client at the sender side through a group control server.

Optionally, the message storage server is further configured to, after storing the voice message, send a notification message to a user at the receiver side.

It should be noted that the converged messaging server in the above-mentioned embodiments is a generic term of the converged messaging server to which a sender belongs and the converged messaging server to which a receiver belongs.

The converged messaging server in the embodiments of the disclosure is a broad concept, may specifically be a converged messaging server in a narrow sense, or may also be a combination of multiple function entities (including the converged messaging server in the narrow sense). When the converged messaging server is the converged messaging server in the narrow sense, functions of the converged messaging server in the embodiments of the disclosure are independently implemented by the converged messaging server in the narrow sense. When the converged messaging server is the combination of the multiple function entities, the functions of the converged messaging server in the embodiments of the disclosure are implemented by the cooperation of the multiple function entities. In other words, the converged messaging server may be a general pronoun of a signaling negotiation (session invitation receiving and processing) function unit, a voice data receiving function unit and a function unit for encapsulating the voice data into the voice message, and may specifically consist of one or more (physical- or logic-level) servers. The entities providing these functions are called collectively the converged messaging server in the embodiments of the disclosure. In practical deployment, the function units may be separately deployed, or may also be merged in a converged messaging server. Specifically, when the voice data is transmitted (on a media plane), the converged messaging client at the sender side may directly communicate with the converged messaging server at the receiver side, or may also communicate with the converged messaging server at the receiver side through the converged messaging server at the sender side. In a scenario of a group, the converged messaging client at the sender side needs to communicate with the converged messaging server to which each receiver belongs through the group control server.

The technical solution of the disclosure is further described below with reference to the drawings and specific embodiments in detail.

Embodiment 1

In this embodiment, a converged messaging service user leaves a voice message to another converged messaging service user.

Specifically, a converged messaging client at the sender side sends a session invitation which carries an identifier of a voice message receiver and indicates this session is for voice messaging; the converged messaging client at the sender side, a converged messaging server at the sender side and a converged messaging server at the receiver side perform signaling interaction to implement a media parameter negotiation; a user at the sender side starts voice messaging, and the converged messaging client at the sender side sends the voice data of the user in real time; the converged messaging server at the receiver side receives the voice data, packs and encapsulates the voice data into one voice message, and stores the voice message in a message storage server to which a user at the receiver side belongs; the message storage server sends a notice to the user at the receiver side, and the user equipment at the receiver side acquires the voice message from the message storage server, and plays the voice message to the user.

Figure 5:
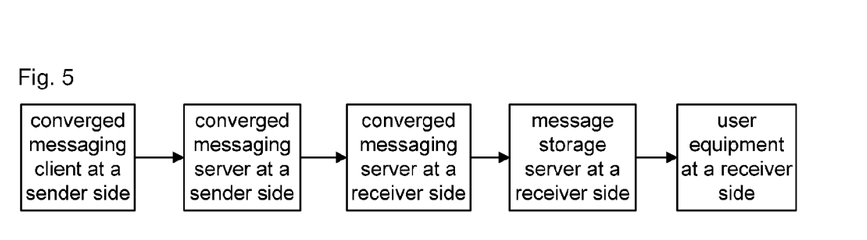
FIG. 5 is a diagram of a system architecture according to embodiment 1 of the disclosure.

A system architecture of this embodiment is as shown in FIG. 5. The system includes a converged messaging client at the sender side, a converged messaging server at the sender side, a converged messaging server at the receiver side, a message storage server at the receiver side and a user equipment at the receiver side (namely a converged messaging client at the receiver side).

Figure 6:
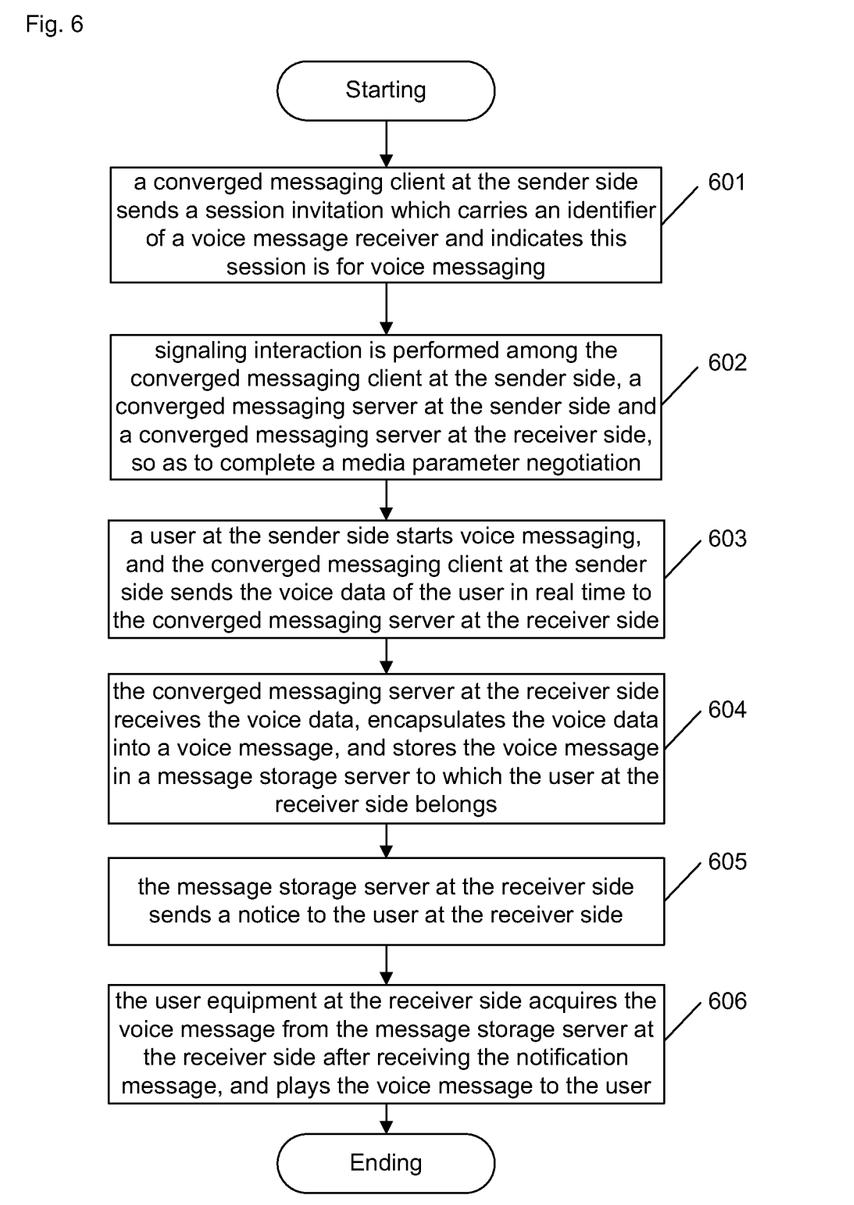
FIG. 6 is a flowchart of signaling according to embodiment 1 of the disclosure.

A flowchart of this embodiment is as shown in FIG. 6. The process includes the following steps.

S601: a converged messaging client at the sender side sends a session invitation which carries an identifier of a voice message receiver and indicates this session is for voice messaging.

Session Invitation Protocol (SIP) may be adopted for the transmitting and receiving of signalings in a converged messaging service system. In the step, the session invitation may be sent through an SIP INVITE request, a Request-Uniform Resource Identifier (Request-URI) of the SIP INVITE request is set to be an identifier of a receiver user, a Header of the SIP INVITE request indicates this session is for voice messaging (or that a destination end of this session is a user supporting a voice message), and for example, a Feature Tag, which is added for indicating the implementation of this solution, can be set in an Accept-Contact Header Field.

S602: signaling interaction is performed among the converged messaging client at the sender side, a converged messaging server at the sender side and a converged messaging server at the receiver side, so as to implement a media parameter negotiation.

Taking SIP as an example, after receiving the SIP INVITE request generated in the previous step, the converged messaging server at the sender side forwards the SIP INVITE request according to the identifier of the receiver user carried in the SIP INVITE request; the receiver converged messaging server acquires the identifier of the receiver user carried in the request after receiving the request, learns about that this session is for voice messaging, and returns an SIP 200 OK response; the SIP 200 OK response is returned to the converged messaging client at the sender side via the converged messaging server at the sender side; the converged messaging client at the sender side finally sends back an SIP ACK message.

Individual network entities implement the media parameter negotiation at the same time of executing the above-mentioned signaling interaction. The media parameter negotiation may be implemented through the Session Description Protocol (SDP).

S603: a user at the sender side starts voice messaging, and the converged messaging client at the sender side sends the voice data of the user in real time, the voice data is received by the converged messaging server at the receiver side.

The voice data may be transmitted through RTP in real time. In this embodiment, the converged messaging client at the sender side transmits in real time the voice data of the user to the converged messaging server at the receiver side through the converged messaging server at the sender side.

S604: the converged messaging server at the receiver side receives the voice data, packs and encapsulates the voice data into a voice message, and stores the voice message in a message storage server to which the user at the receiver side belongs.

The converged messaging server at the receiver side may pack and encapsulate the voice data through Multipurpose Internet Mail Extensions (MIME); and then the converged messaging server at the receiver side may store the encapsulated voice message in a message storage server at the receiver side through an APPEND instruction of Internet Message Access Protocol (IMAP).

S605: the message storage server at the receiver side sends a notice to the user at the receiver side to inform the user at the receiver side of the delivery of the new voice message.

The message storage server at the receiver side may send a notification message to the receiver user by means of prior arts such as a short message.

S606: the user equipment at the receiver side acquires the voice message from the message storage server at the receiver side after receiving the notification message, and plays the voice message to the user.

The user equipment at the receiver side may acquire the voice message from the receiver message storage server by means of a FETCH instruction of IMAP.

Embodiment 2

In this embodiment, a converged messaging service user leaves a voice message to a converged messaging service user group (namely multiple converged messaging service users).

Specifically, a converged messaging client at the sender side sends a session invitation which carries a group identifier or the identifier of each user in the group and indicates this session is for voice messaging; a media parameter negotiation is implemented through signaling interaction among the converged messaging client at the sender side, a converged messaging server at the sender side, a group control server and the converged messaging server to which each user at the receiver side belongs; a user at the sender side starts voice messaging, and the converged messaging client at the sender side transmits the voice data of the user to the group control server in real time; each converged messaging server at the receiver side respectively receives the voice data forwarded by the group control server, packs and encapsulates the voice data into a voice message, and stores the voice message in a message storage server to which the corresponding user at the receiver side belongs; and the message storage servers send a notice to the corresponding receiver users, and each user equipment at the receiver side acquires the voice message from the message storage server to which the corresponding user belongs, and plays the voice message to the user.

Figure 7:
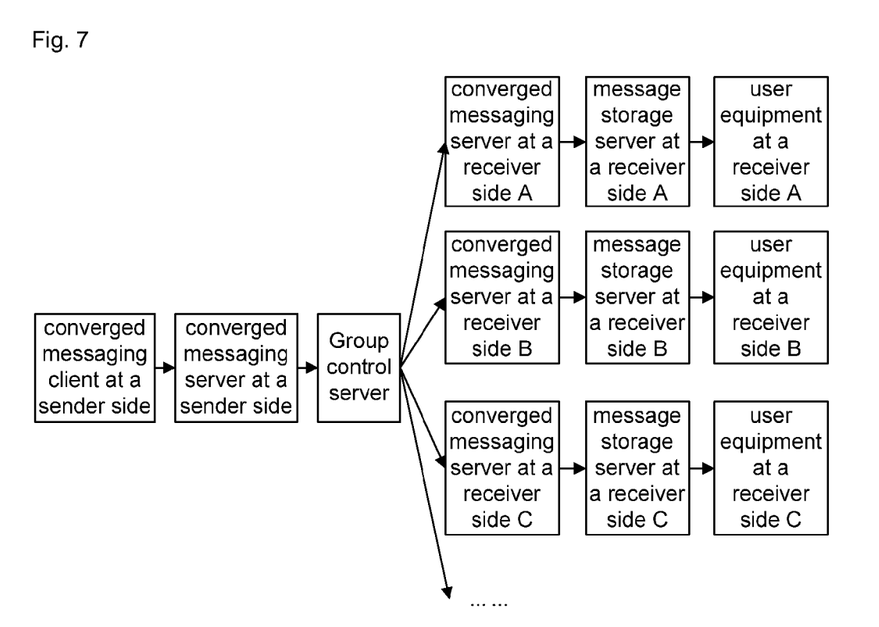
FIG. 7 is a diagram of a system architecture according to embodiment 2 of the disclosure.

A system architecture of this embodiment is as shown in FIG. 7. The system includes a converged messaging client at the sender side, a converged messaging server at the sender side, a group control server, and converged messaging servers at the receiver side corresponding to respective users at the receiver side and message storage servers at the receiver side corresponding to respective users at the receiver side, and user equipments at the receiver side.

Figure 8:
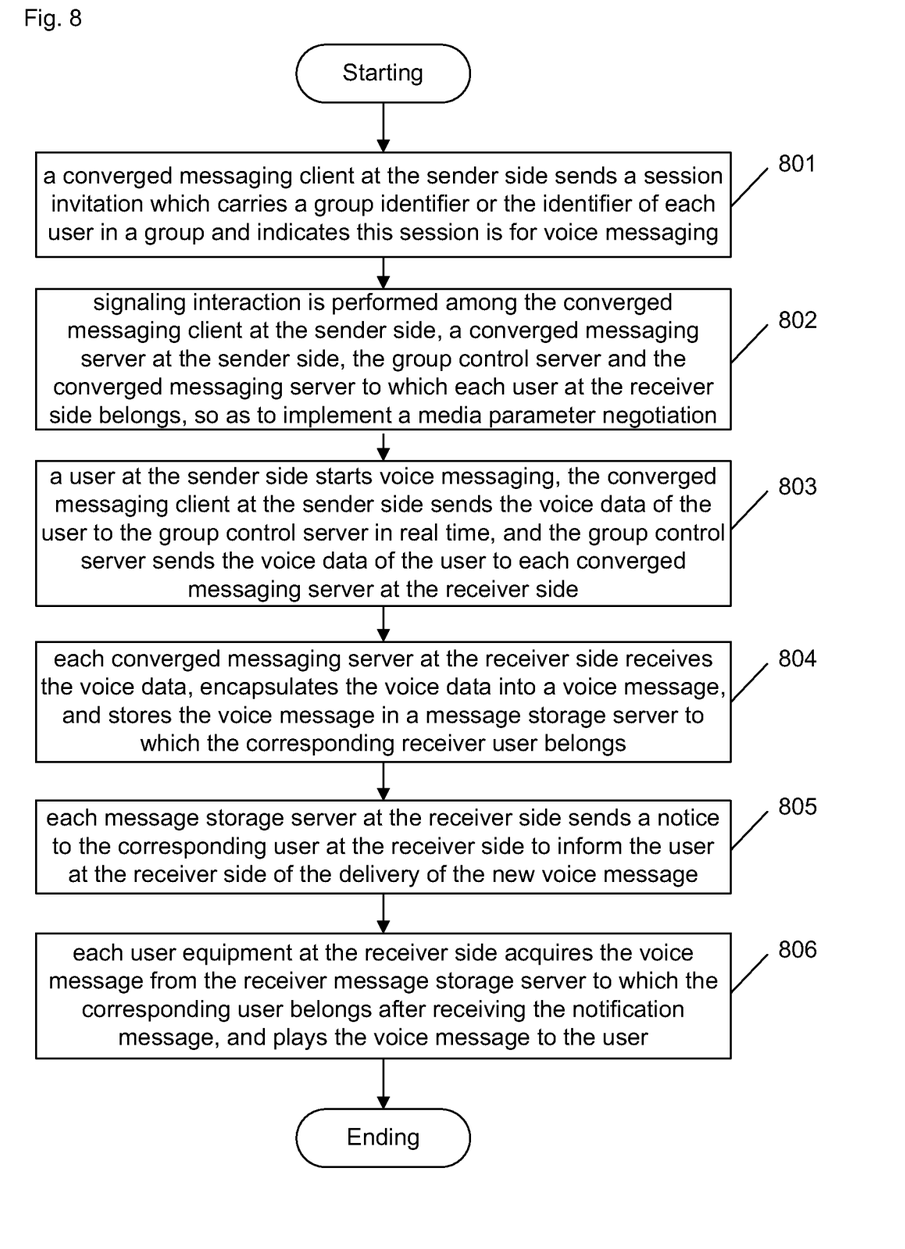
FIG. 8 is a flowchart of signaling according to embodiment 2 of the disclosure.

A flowchart of this embodiment is as shown in FIG. 8. The process includes the following steps.

S801: a converged messaging client at the sender side sends a session invitation which carries a group identifier or the identifier of each user in a group and indicates this session is for voice messaging.

in the step, taking SIP as an example, the session invitation may be transmitted through an SIP INVITE request, a Request-URI parameter of the SIP INVITE request is set to be an identifier of a user group at the receiver side or an identifier of a group control server (for the latter, the identifier of each user at the receiver side needs also to be listed in a message body), a Header of the SIP INVITE request indicates this session for voice messaging (or that a destination end of this session is a user supporting a voice message), and for example, a Feature Tag which is added for indicating the implementation of this solution, can be set in an Accept-Contact Header Field.

S802: signaling interaction is performed among the converged messaging client at the sender side, a converged messaging server at the sender side, the group control server and the converged messaging server to which each user at the receiver side belongs, so as to implement a media parameter negotiation.

Taking SIP as an example, after receiving the SIP INVITE request generated in the previous step, and the converged messaging server at the sender side forwards the SIP INVITE request according to the identifier of the user group at the receiver side or the identifier of the group control server carried in the SIP INVITE request; the group control server forwards the INVITE request to each receiver according to the group identifier or the identifier of each receiver user carried in the INVITE request after receiving the request; each converged messaging server at the receiver side acquires the identifier of the corresponding receiver user carried in the request after receiving the request, learns about that this session is for voice messaging, and returns an SIP 200 OK response; the SIP 200 OK response is returned to the converged messaging client at the sender side via the group control server and the converged messaging server at the sender side; the converged messaging client at the sender side finally sends back an SIP ACK message.

Individual network entities implement the media parameter negotiation at the same time of executing the above-mentioned signaling interaction The media parameter negotiation may be implemented through the SDP.

S803: a user at the sender side starts voice messaging, the converged messaging client at the sender side sends the voice data of the user to the group control server in real time, and the group control server sends the voice data of the user to each converged messaging server at the receiver side.

The voice data may be transmitted through RTP in real time. In this embodiment, the converged messaging client at the sender side transmits in real time the voice data of the user to the converged messaging servers at the receiver side through the group control server.

S804: each converged messaging server at the receiver side receives the voice data, packs and encapsulates the voice data into a voice message, and stores the voice message in a message storage server to which the corresponding receiver user belongs.

Each converged messaging server at the receiver side may pack and encapsulate the received voice data through MIME; and then each converged messaging server at the receiver side may store the encapsulated voice message in a message storage server at the receiver side through an APPEND instruction of IMAP.

S805: each message storage server at the receiver side sends a notice to the corresponding user at the receiver side to inform the user at the receiver side of the delivery of the new voice message.

Each message storage server at the receiver side may transmit a notification message to the corresponding receiver user by means of prior arts such as a short message.

S806: each user equipment at the receiver side acquires the voice message from the receiver message storage server to which the corresponding user belongs after receiving the notification message, and plays the voice message to the user.

Each user equipment at the receiver side may acquire the voice message from the corresponding receiver message storage server by means of a FETCH instruction of IMAP.

The above are only preferred embodiments of the disclosure and not intended to limit the scope of protection of the disclosure.

The invention claimed is:

1. A voice messaging method, comprising:
   initiating, by a converged messaging client at a sender side, a session invitation, and having a media negotiation with a converged messaging server;
   sending, by the converged messaging client at the sender side, voice data to the converged messaging server according to a result of the media negotiation;
   encapsulating, by the converged messaging server, the received voice data into a voice message, and storing the voice message in a message storage server; and
   acquiring, by a converged messaging client at a receiver side, the voice message from the message storage server,
   wherein the session invitation carries information on a voice message receiver and indicates this session is for voice messaging,
   wherein the session invitation is initiated through a Session Invitation Protocol (SIP) INVITE request,
   wherein a Request-Uniform Resource Identifier (Request-URI) of the SIP INVITE request is set to contain the information on the voice message receiver,
   wherein a Feature Tag which indicates that this session is for voice messaging is added in an Accept-Contact Header Field of the SIP INVITE request,
   wherein the converged messaging server encapsulates the received voice data through Multipurpose Internet Mail Extensions (MIME),
   wherein the converged messaging server stores the encapsulated voice message in the message storage server through an APPEND instruction of Internet Message Access Protocol (IMAP); and
   wherein the converged messaging client at the receiver side acquires the voice message from the message storage server by means of a FETCH instruction of the IMAP.

2. The method according to claim 1, wherein the information on a voice message receiver carried in the session invitation is a user identifier, and
   wherein the voice data is sent by the converged message client at the sender side to the converged messaging server to which a voice message receiver belongs through the Real-Time Transport Protocol (RTP).

3. The method according to claim 1, wherein the information on a voice message receiver carried in the session invitation is a group identifier or a user identifier of each user in a group, and
   wherein the sending, by the converged message client at the sender side, voice data to the converged messaging server comprises:
   sending, by the converged messaging client at the sender side, the voice data to a group control server through the RTP; and
   sending, by the group control server, the voice data to each converged messaging server to which the voice message receiver belongs through the RTP.

4. The method according to claim 1, further comprising: sending, by the message storage server, a notification message to a user at the receiver side after storing the voice message.

5. A converged messaging server, comprising:
   a memory;
   one or more processors; and
   a media negotiation unit, a voice data receiving unit and a voice message generation unit, these units are stored in the memory and executed by the one or more processors,
   wherein the media negotiation unit is configured to have a media negotiation with a converged messaging client at a sender side after a session invitation is initiated by the converged messaging client at the sender side, wherein the session invitation carries information on a voice receiver and indicates this session is for voice messaging,
   wherein the voice data receiving unit is configured to receive voice data sent by the converged messaging client at the sender side, and
   wherein the voice message generation unit is configured to encapsulate the voice data received by the voice data receiving unit into a voice message and store the voice message in a message storage server,
   wherein the session invitation is initiated through a Session Invitation Protocol (SIP) INVITE request,
   wherein a Request-Uniform Resource Identifier (Request-URI) of the SIP INVITE request is set to contain the information on the voice message receiver,
   wherein a Feature Tag which indicates that this session is for voice messaging is added in an Accept-Contact Header Field of the SIP INVITE request,
   wherein the voice message generation unit encapsulates the received voice data through Multipurpose Internet Mail Extensions (MIME),
   wherein the voice message generation unit stores the encapsulated voice message in the message storage server through an APPEND instruction of Internet Message Access Protocol (IMAP); and wherein the converged messaging client at the receiver side acquires the voice message from the message storage server by means of a FETCH instruction of the IMAP.

6. A converged messaging client, comprising:
a memory;
one or more processors; and
a session invitation initiation unit, a media negotiation unit and a voice data sending unit, these units are stored in the memory and executed by the one or more processors,
wherein the session invitation initiation unit is configured to initiate a session invitation which carries information on a voice message receiver and indicates this session is for voice messaging,
wherein the media negotiation unit is configured to have a media negotiation with a converged messaging server after the session invitation is initiated by the session invitation initiation unit, and
wherein the voice data sending unit is configured to send voice data to the converged messaging server according to a negotiation result from the media negotiation unit,
wherein the session invitation is initiated through a Session Invitation Protocol (SIP) INVITE request,
wherein a Request-Uniform Resource Identifier (Request-URI) of the SIP INVITE request is set to contain the information on the voice message receiver,
wherein a Feature Tag which indicates that this session is for voice messaging is added in an Accept-Contact Header Field of the SIP INVITE request,
wherein the voice message generation unit encapsulates the received voice data through Multipurpose Internet Mail Extensions (MIME),
wherein the voice message generation unit stores the encapsulated voice message in the message storage server through an APPEND instruction of Internet Message Access Protocol (IMAP); and
wherein the converged messaging client at the receiver side acquires the voice message from the message storage server by means of a FETCH instruction of the IMAP.

7. A voice messaging system, comprising:
a converged messaging client at a sender side, a converged messaging server, a message storage server and a converged messaging client at a receiver side,
wherein the converged messaging client at the sender side comprises:
a first memory;
one or more first processors; and
a session invitation initiation unit, a media negotiation unit and a voice data sending unit, these units are stored in the first memory and executed by the one or more first processors,
wherein the session invitation initiation unit is configured to initiate a session invitation which carries information on a voice message receiver and indicates this session is for voice messaging,
wherein the media negotiation unit is configured to have a media negotiation with a converged messaging server after the session invitation is initiated by the session invitation initiation unit, and
wherein the voice data sending unit is configured to send voice data to the converged messaging server according to a negotiation result from the media negotiation unit, wherein the converged messaging server comprises:
a second memory;
one or more second processors; and
a media negotiation unit, a voice data receiving unit and a voice message generation unit, these units are stored in the second memory and executed by the one or more second processors,
wherein the media negotiation unit is configured to have a media negotiation with a converged messaging client at a sender side after a session invitation is initiated by the converged messaging client at the sender side, wherein the session invitation carries information on a voice receiver and indicates this session is for voice messaging,
wherein the voice data receiving unit is configured to receive voice data sent by the converged messaging client at the sender side, and
wherein the voice message generation unit is configured to encapsulate the voice data received by the voice data receiving unit into a voice message and store the voice message in a message storage server,
wherein the message storage server is configured to store a voice message, and
wherein the converged messaging client at the receiver side is configured to acquire the voice message from the message storage server,
wherein the session invitation is initiated through a Session Invitation Protocol (SIP) INVITE request,
wherein a Request-Uniform Resource Identifier (Request-URI) of the SIP INVITE request is set to contain the information on the voice message receiver,
wherein a Feature Tag which indicates that this session is for voice messaging is added in an Accept-Contact Header Field of the SIP INVITE request,
wherein the voice message generation unit encapsulates the received voice data through Multipurpose Internet Mail Extensions (MIME),
wherein the voice message generation unit stores the encapsulated voice message in the message storage server through an APPEND instruction of Internet Message Access Protocol (IMAP); and
wherein the converged messaging client at the receiver side acquires the voice message from the message storage server by means of a FETCH instruction of the IMAP.

8. The system according to claim 7, wherein the converged messaging server is configured to receive voice data sent by the converged messaging client at the sender side, or to receive the voice data sent from the converged messaging client at the sender side via a group control server.

9. The system according to claim 7, wherein the message storage server is further configured to, after storing the voice message, send a notification message to a user at the receiver side.

10. The method according to claim 2, further comprising: sending, by the message storage server, a notification message to a user at the receiver side after storing the voice message.

11. The method according to claim 3, further comprising: sending, by the message storage server, a notification message to a user at the receiver side after storing the voice message.

12. The system according to claim 8, wherein the message storage server is further configured to, after storing the voice message, send a notification message to a user at the receiver side.

* * * * *